United States Patent
Lin et al.

(10) Patent No.: US 9,672,067 B2
(45) Date of Patent: Jun. 6, 2017

(54) DATA PROCESSING METHOD AND SYSTEM WITH APPLICATION-LEVEL INFORMATION AWARENESS

(71) Applicant: MACRONIX INTERNATIONAL CO., LTD., Hsinchu (TW)

(72) Inventors: Ye-Jyun Lin, New Taipei (TW); Hsiang-Pang Li, Zhubei (TW); Shang-Xuan Zou, New Taipei (TW); Chia-Lin Yang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 4 days.

(21) Appl. No.: 14/696,657

(22) Filed: Apr. 27, 2015

(65) Prior Publication Data
US 2016/0154674 A1 Jun. 2, 2016

Related U.S. Application Data

(60) Provisional application No. 62/086,167, filed on Dec. 1, 2014.

(51) Int. Cl.
*G06F 9/48* (2006.01)

(52) U.S. Cl.
CPC .......... *G06F 9/4881* (2013.01); *G06F 9/4812* (2013.01)

(58) Field of Classification Search
CPC ................. G06F 9/5005; G06F 2212/1024
See application file for complete search history.

(56) References Cited

U.S. PATENT DOCUMENTS

| | | | |
|---|---|---|---|
| 2007/0005795 A1 | 1/2007 | Gonzalez | |
| 2008/0222311 A1* | 9/2008 | Lee | G06F 3/061 710/6 |
| 2011/0023033 A1* | 1/2011 | Memik | G06F 9/3851 718/100 |
| 2012/0087632 A1* | 4/2012 | Mabuchi | H04N 5/783 386/235 |
| 2013/0290601 A1* | 10/2013 | Sablok | G06F 12/0246 711/103 |

(Continued)

FOREIGN PATENT DOCUMENTS

TW 200400764 A 1/2004

OTHER PUBLICATIONS

Kim, H.; Lee, M.; Han, W.; Lee, K.; Shin, I., "Aciom: application characteristics-aware disk and network i/o management on android platform" (2011), Prceedings of the ninth ACM international conference on Embedded software, pp. 49-58 [retrieved from http://dl.acm.org/citation.cfm?id=2038652].*

(Continued)

*Primary Examiner* — Brian W Wathen
(74) *Attorney, Agent, or Firm* — McClure, Qualey & Rodack, LLP

(57) ABSTRACT

A data processing system comprises a storage device, an interface module and a scheduler. The interface module is configured to dispatch a non-prioritized request via a first data path, and to transfer application-level information of an application via a second data path. The scheduler, coupled to the first and second data path, is configured to enable an access to the storage device according to the non-prioritized request and the application-level information respectively received from the first and second data paths.

17 Claims, 9 Drawing Sheets

(56) References Cited

U.S. PATENT DOCUMENTS

| | | | |
|---|---|---|---|
| 2013/0290953 A1 | 10/2013 | Li et al. | |
| 2015/0058861 A1* | 2/2015 | Zheng | H04L 47/56 718/104 |
| 2015/0347327 A1* | 12/2015 | Blaine | G06F 13/18 711/103 |

OTHER PUBLICATIONS

TIPO Office Action dated Aug. 29, 2016 in Taiwan application (No. 104112793).

* cited by examiner

DATA PROCESSING METHOD AND SYSTEM WITH APPLICATION-LEVEL INFORMATION AWARENESS

RELATED APPLICATION

This application claims the benefit of U.S. provisional application Ser. No. 62/086,167, filed Dec. 1, 2014, the disclosure of which is incorporated by reference herein in its entirety.

TECHNICAL FIELD

The disclosure relates in general to a data processing method and an associated system, and more particularly to a data processing method and an associated system with application-level information awareness.

BACKGROUND

Modern electronic devices usually have multiple applications run concurrently. These applications may dispatch I/O requests to access the storage when executed on the operating system.

However, in a traditional system, the I/O scheduler usually uses its own priority scheme to determine the service order of the I/O requests. The I/O scheduler is not aware of the application-level information when scheduling the requests.

For example, when two applications access the storage of a system concurrently, the I/O requests from the two applications may arrive at the I/O scheduler in an interleaving order, and the I/O requests will be served in their arrival order. In such circumstance, both tasks are slowed down, which in turn degrade the overall system throughput.

Therefore, there is a need to provide a data processing method and an associated system with application-level information awareness, such that the I/O requests can be scheduled based on the application-level information.

SUMMARY

The present invention is directed to a data processing method and an associated system with application-level information awareness.

According to an embodiment of the present invention, a data processing system is provided. The data processing system comprises a storage device, an interface module and a scheduler. The interface module, implemented by a processor coupled to the storage device, is configured to dispatch a non-prioritized request via a first data path, and to transfer application-level information of an application via a second data path. The scheduler, coupled to the first and second data path, is configured to enable an access to the storage device according to the non-prioritized request and the application-level information respectively received from the first and second data paths.

According to another embodiment the present invention, a data processing system is provided. The data processing system comprises a processor, a first memory and a second memory. The processor is configured to dispatch a non-prioritized request via a first data path, and to transfer application-level information of an application via a second data path. The first memory, coupled to the processor, is configured to store the application-level information dispatched by the processor. The second memory is coupled to the processor, wherein the processor schedules the non-prioritized request to access the second memory according to the application-level information stored in the first memory.

According to still another embodiment the present invention, a processor-implemented data processing method is provided. The processor-implemented data processing method comprises the following steps. A non-prioritized request is transferred via a first data path. Application-level information of an application is transferred via a second data path. An access to a storage device is enabled according to the non-prioritized request received from the first data path and the application-level information received from the second data path.

The above and other aspects of the disclosure will become better understood with regard to the following detailed description of the preferred but non-limiting embodiment(s). The following description is made with reference to the accompanying drawings.

DETAILED DESCRIPTION

Figure 1:
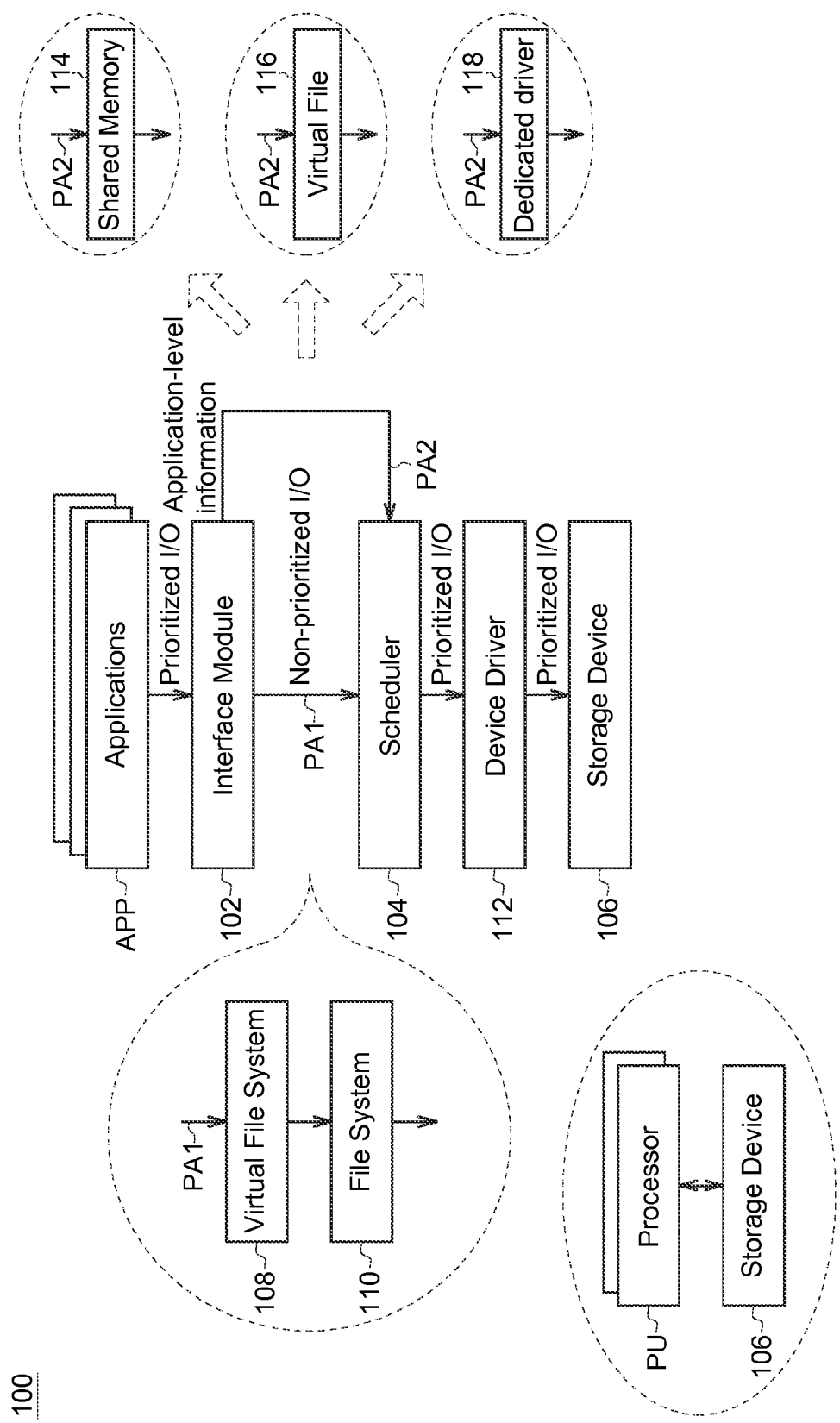
FIG. 1 is an exemplary I/O request flow of a data processing system according to one embodiment of the present invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is an exemplary I/O request flow of a data processing system 100 according to one embodiment of the present invention. The I/O infrastructures of the data processing system 100 mainly comprise an interface module 102, a scheduler 104 and a storage device 106.

The interface module 102 can be implemented by one or more processors PU coupled to the storage device 106. In one embodiment, the interface module 102 can be implemented as an application/program module or stacked below the application layer in the system 100. The scheduler 104 can be implemented by software, firmware or hardware (e.g., logic circuits). In one embodiment, the scheduler 104 can also be implemented by the processors PU. It is noted that in FIG. 1 the scheduler 104 is implemented between the interface module 102 and the device driver 112, but the present invention is not limited thereto. In one embodiment, the scheduler 104 could also be implemented between the device driver 112 and the storage device 106. The storage device 106 can be implemented by most of the non-volatile memories, e.g., NOR/NAND flash, Phase Change Memory (PCM), ReRAM, STT-MRAM, etc.

The interface module 102 may dispatch application-related data via two independent dada paths PA1 and PA2. In one aspect, the interface module 102 may dispatch one or more non-prioritized requests in response to the I/O requests dispatched by the applications APP. The non-prioritized requests are transferred via a first data path PA1. In another aspect, the interface module 102 may monitor the applications APP to collect the corresponding application-level information, and transfer the application-level information via a second data path PA2. In one embodiment, the application-level information may come from a virtual machine, an operating system, application programmers, etc., or estimated by the interface module 102. The application-level information may comprise at least one of a priority level of the one or more applications and an operating state of the one or more applications. In one embodiment, the application-level information may comprise virtual machine identifiers (IDs), application IDs and process IDs to indicate where the I/O requests came from.

When executed on the operating system, the applications APP may dispatch prioritized I/O request(s). The prioritized I/O request can be, for example, an I/O request assigned by a corresponding priority level, e.g., a high priority, a medium priority or a low priority. The priority level determines the I/O request's service order in the system. The priority scheme can be according to any application types such as foreground/background, I/O intensive/non-intensive, etc., or defined by application programmers. Generally, once a prioritized I/O request is served, its priority information becomes invisible. As shown in FIG. 1, the prioritized I/O requests dispatched by the applications APP becomes non-prioritized I/O requests (i.e., without the priority information) as they pass through the interface module 102.

As mentioned earlier, the first data path PA1 can be used to transfer the non-prioritized requests. In one embodiment, the first data path PA1 may comprise I/O infrastructures such as a virtual file system 108 and a file system 110. The virtual file system 108 can be an abstraction layer on top of a more concrete file system 110. The file system 110 can be used to control how data is stored into or retrieved from the storage device 106. Understandably, the present invention is not limited thereto. The first data path PA1 may have various I/O infrastructures according to practical designs or needs.

The scheduler 104, coupled to the first and second data paths PA1 and PA2, can be used to enable an access to the storage device 106 according to the one or more non-prioritized requests received from the first data path PA1 and the application-level information received from the second data path PA2. For example, the scheduler 104 may dispatch the reformed prioritized I/O requests to a device driver 112 of the system 100 to enable hardware functions of the storage device 106.

The abovementioned I/O infrastructures of the data processing system 100 can be implemented by various ways. In one embodiment, each layer of I/O infrastructures of the data processing system 100 can be implemented by the processors PU, except the underlying layer of the storage device 106. In another embodiment, each layer of I/O infrastructures can be implemented by corresponding logic circuits and/or hardware module. In still another embodiment, some layers of I/O infrastructures can be implemented by the processors PU, while others can be implemented by circuits/hardware modules.

The second data path PA2 is able to make the transfer of the application-level information independent from the first data path PA1. Thus, the application-information can be transferred to the scheduler 104 without modifying the original formats of I/O requests.

As shown in FIG. 1, the second data path PA2 bypasses the virtual file system 108 and the file system 110 of the first data path PA1, and is directly coupled to the scheduler 104. Thus, even when the data processing system 100 includes I/O infrastructures that would waive the priority information, the priority information can still be transferred to the lower layer (e.g., the scheduler 104) of the system 100 to perform I/O request scheduling.

The transfer of the application-level information through the second data path PA2 can be implemented by various ways. For example, the second data path PA2 may comprise a shared memory 114 to store the application-level information obtained from the interface module 102, such that the scheduler 104 can obtain the application-level information from the shared memory 114. The shared memory 114 can be either a part of the storage device 106, or a memory space independent from the storage device 106. In one embodiment, the shared memory 114 includes violate memory, such as dynamic random access memory (DRAM).

In another example, the second data path PA2 may comprise a virtual file 116 to record the application-level information obtained from the interface module 102, such that the scheduler 104 can obtain the application-level information from the virtual file 116. For example, during monitoring the applications APP, the interface module 102 can create a virtual file 116 to record the collected application-level information. The scheduler 104 can obtain the application-level information by accessing the virtual file 116.

In still another example, the second data path PA2 may comprise a dedicated driver 118 to directly dispatch the collected application-level information to the scheduler 104. Understandably, the present invention is not limited to the above examples. The second data path PA2 for transferring the application-level information can be implemented by other ways according to practical needs. For example, the second data path can be implemented by additional application or other software methods.

Figure 2A:
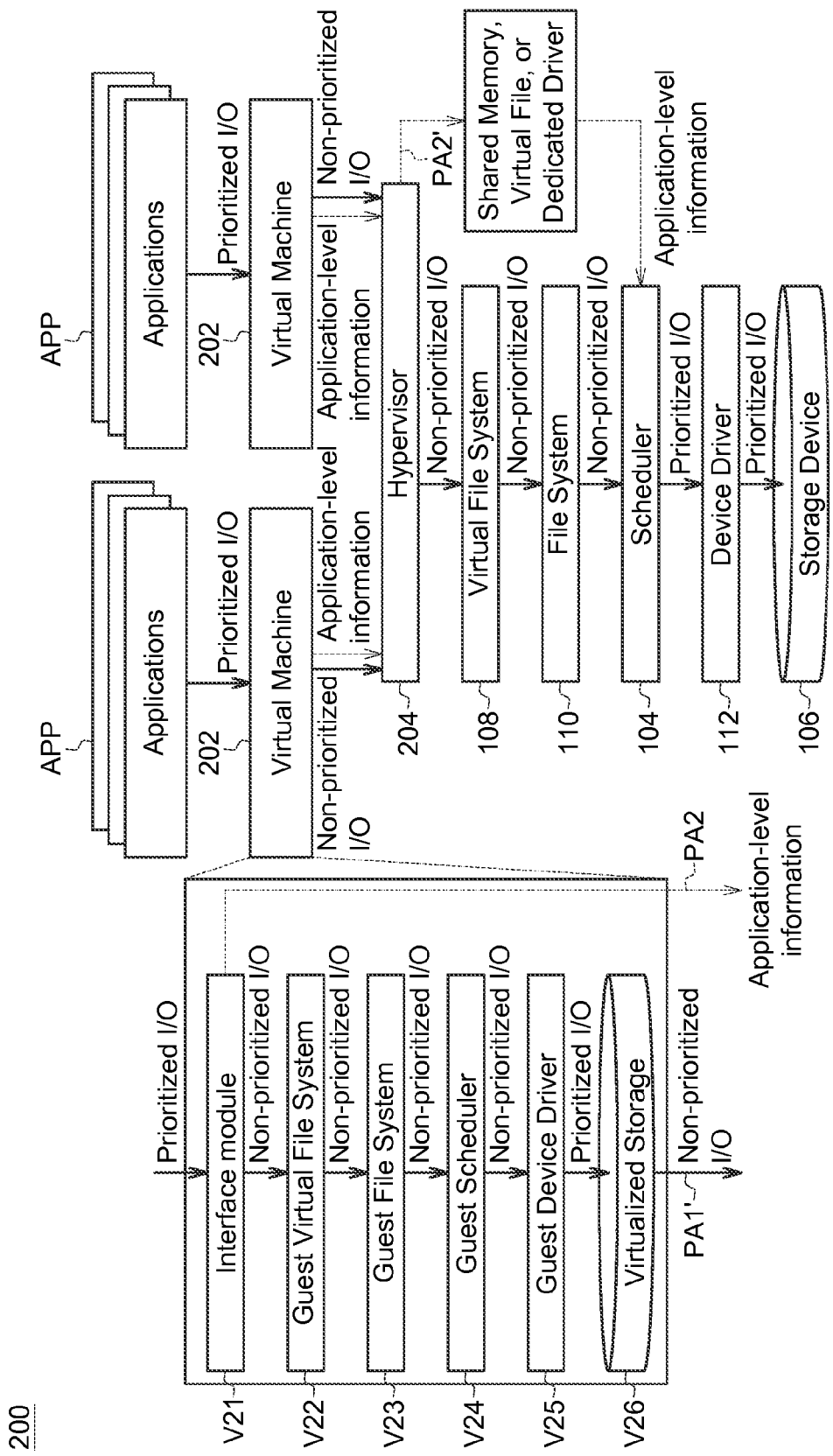
FIG. 2A illustrates an exemplary I/O request flow of a data processing system according to one embodiment of the present invention.

FIG. 2A illustrates an exemplary I/O request flow of a data processing system 200 according to one embodiment of the present invention. The main difference between the data processing system 200 and the data processing system 100 is that the data processing system 200 further comprises a plurality of virtual machines 202 and a hypervisor 204. The virtual machines 202 can be an emulation of a computer system and has its corresponding operating system. Applications APP are executed independent on the operating system. The hypervisor 204 is configured to conduct the virtual machines 202. That is, the hypervisor 204 can be regarded as a virtual machine manager, allowing operating systems to run concurrently on the data processing system 200.

In the example of FIG. 2A, each virtual machine 202 comprises virtualized I/O infrastructures similar to that in FIG. 1. As shown in FIG. 2A, each virtual machine 202 has its corresponding interface module V21, guest virtual file system V22, guest file system V23, guest scheduler V24, guest device driver V25 and virtualized storage device V26.

Similar to the previous embodiments, non-prioritized requests can be dispatched via the first data path PA1' passing through the virtualized I/O infrastructures of the virtual machine 202, while the application-level information related to the applications APP can by transferred by the interface module V21 of the virtual machine 202 via the second data path PA2'.

Figure 2B:
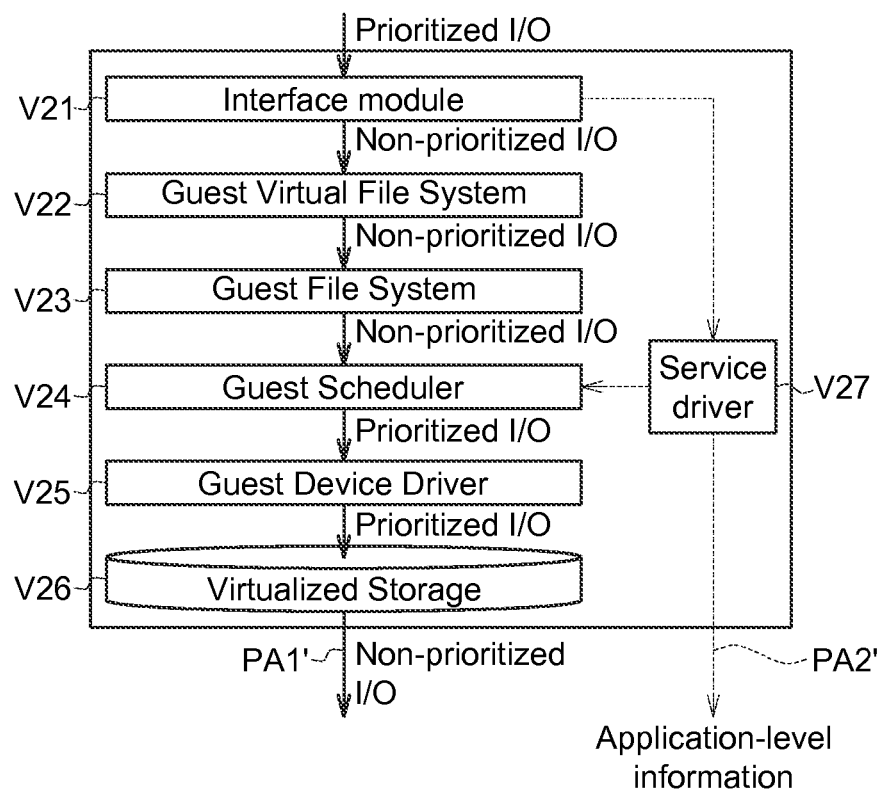
FIG. 2B illustrates an exemplary I/O request flow of a virtual machine according to another embodiment of the present invention.

FIG. 2B illustrates an exemplary I/O request flow of a virtual machine 202' according to another embodiment of the present invention. The main difference between the virtual machine 202' and the virtual machine 202 shown in FIG. 2A is that the virtual machine 202' further comprises a service driver V27 to transfer the application-level information to the internal guest scheduler V24. In such circumstance, the virtualized storage device V26 in the virtual machine 202' can also aware the information from the application-level. Noticeably, since the priority information ends up at the virtualized storage device V26, the output of the virtualized storage device V26 may still turn back to a non-prioritized request. Thus, the application-level information is transferred by the second data path PA2', as shown in FIG. 2B.

Figure 3:
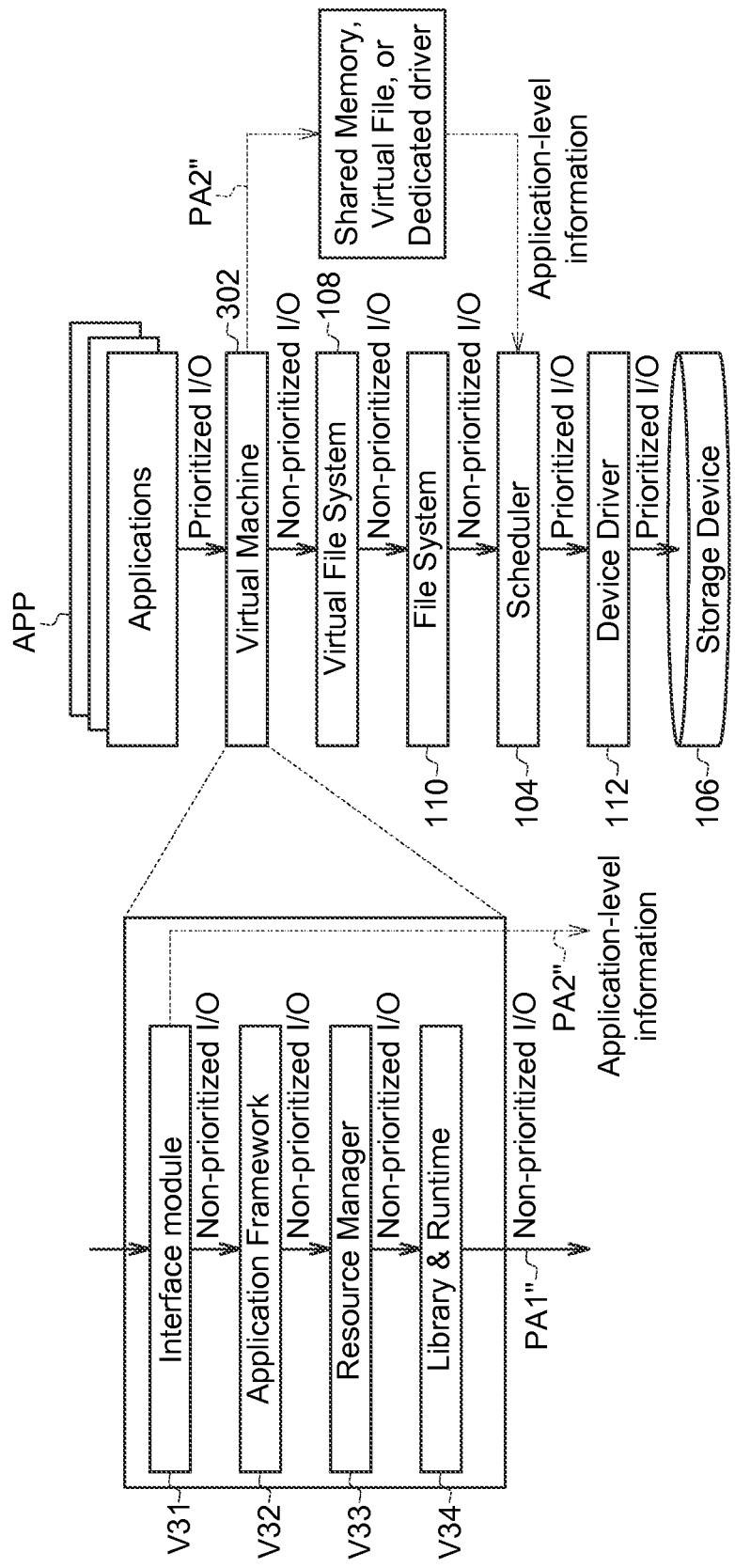
FIG. 3 illustrates an exemplary I/O request flow of a data processing system according to one embodiment of the present invention.

FIG. 3 illustrates an exemplary I/O request flow of a data processing system 300 according to one embodiment of the present invention. The main difference between the data processing system 300 and the data processing system 200 is that the data processing system 300 comprises a virtual machine 302 which is without a guest operating system. Such virtualized system may be implemented in Android/iOS smartphones, for example.

In the example of FIG. 3, the virtual machine 302 comprises interface module V31, an application framework V32, a resource manager V33 and a library & runtime module V34. Similar to the previous embodiments, non-prioritized requests can be dispatched via the first data path PA1" passing through the virtualized I/O infrastructures of the virtual machine 302, while the application-level information related to the applications APP can by transferred by the interface module V31 of the virtual machine 302 via the second data path PA2".

As described earlier, the scheduler 104 may enable an access to the storage device 106 according to the non-prioritized requests and the application-level information. For example, if the application-level information contains the priority level information, the scheduler 104 can use the priority level information to perform request batching and scheduling to manage the access of the storage device 106.

Figure 4:
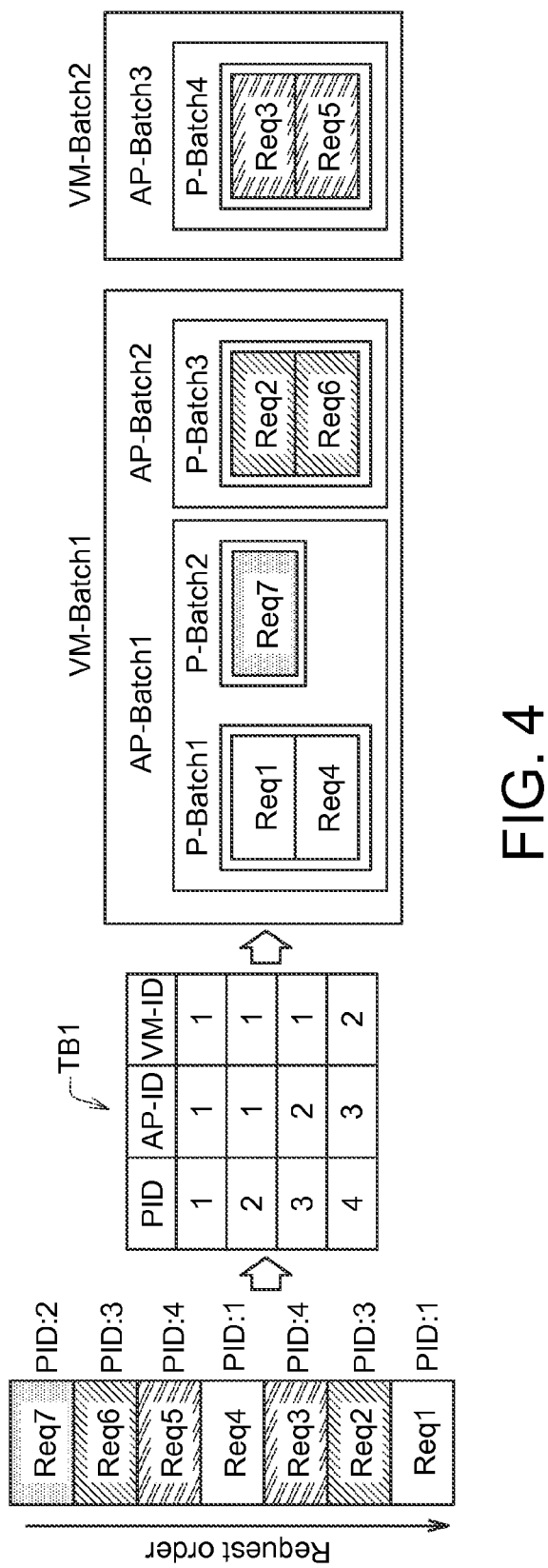
FIG. 4 illustrates an exemplary request batching according to one embodiment of the present invention.

FIG. 4 illustrates an exemplary request batching according to one embodiment of the present invention. In the embodiment, requests are formed into batches by the scheduler 104. As shown in FIG. 4, the process batch P-BATCH1 contains requests Req1 and Req4 having the same process ID PID: 1; the process batch P-BATCH2 contains the requests Req2 having the process ID PID: 2; the process batch P-BATCH3 contains requests Req2 and Req6 having the same process ID PID: 3; the process batch P-BATCH4 contains requests Req3 and Req5 having the same process ID PID: 4. Since the scheduler 104 may obtain the application-level information from the second data path PA2, it knows each process's corresponding application ID (AP-ID) and/or virtual machine ID (VM-ID). That is, the scheduler 104 may identify which process comes from which application and virtual machine (if existing).

Taking a three-level batch hierarchy (virtual machine level, application level, process level) as an example, after the scheduler 104 identifies the corresponding virtual machine/application for each non-prioritized request according to the application-level information, the scheduler 104 may form the non-prioritized requests that came from the same virtual machine into a virtual-machine-level batch. Within the virtual-machine-level batch, the scheduler 104 further forms requests that came from the same application into an application-level batch. Within the application-level batch, requests that came from the same process are formed into a process-level batch.

As shown in FIG. 4, the process batches P-BATCH1 and P-BATCH2, which are corresponding to the same application ID AP-ID: 1 and virtual machine ID VM-ID: 1, are allocated into the same application batch AP-BATCH1 and the same virtual machine batch VM-Batch1, and the process batch P-BATCH3, which has AP-ID: 2 and VM-ID: 1, is allocated into another application batch AP-BATCH2 of the same virtual machine batch VM-Batch1. Based on the same request batching policy, the process batches P-BATCH4, which has AP-ID: 3 and VM-ID: 2, is allocated into the application batch AP-BATCH3 of the virtual machine batch VM-Batch2.

Figure 5:
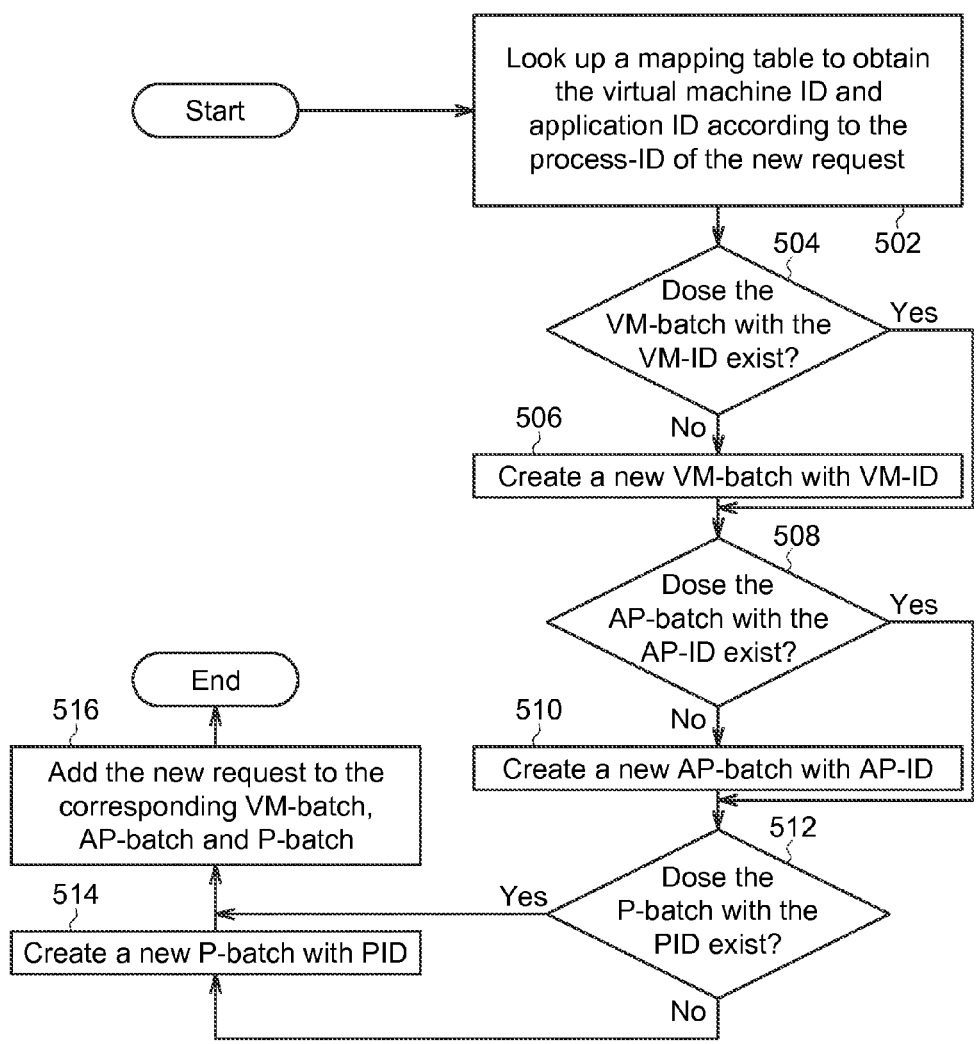
FIG. 5 illustrates a flowchart of request batching according to one embodiment of the present invention.

FIG. 5 illustrates a flowchart 500 of request batching according to one embodiment of the present invention. The request batching starts, for example, when the scheduler 104 receives a new request from the application(s) APP. At step 502, the scheduler 104 may look up a mapping table to obtain the virtual machine ID and the application ID according to the process ID of the new request. One example of the mapping table is the table TB1 shown in FIG. 4, which records the corresponding application ID (AP-ID) and virtual machine ID (VM-ID) for each process ID (PID). Understandably, the present invention is not limited thereto. The mapping table can be implemented by various ways, such as listing entries, lookup table, or any other data formation capable of recording each process/request's corresponding application ID and virtual machine ID (if existing).

At step 504, the scheduler 104 determines whether the virtual machine batch (VM-batch) with the VM-ID exists. If not, a new VM-batch with the VM-ID is created at step 506. If yes, the procedure continues to step 508, and the scheduler 104 determines that whether the application batch (AP-batch) with the AP-ID exists. If the determination result of step 508 is negative, a new AP-batch with the AP-ID is created at step 510. If the determination result of step 508 is positive, the procedure goes to step 510. The scheduler 104 then determines that whether the process batch (P-batch) with the PID exists at step 512. If no such P-batch exists, a new P-batch with the P-ID is created at step 514, and the new request is added to the corresponding VM-batch, AP-batch and P-batch, as shown in step 516.

After the requests are formed into batches, the scheduler 104 may conduct intra scheduling policy and/or inter scheduling policy to arrange the service order of the batches. In one embodiment, the intra scheduling policy is configured to deal with the service order of batches within a VM-batch (or a batch with the highest batch hierarchy level). In one embodiment, the inter scheduling policy is configured to deal with the service order between a plurality of prioritized batches.

Figure 6:
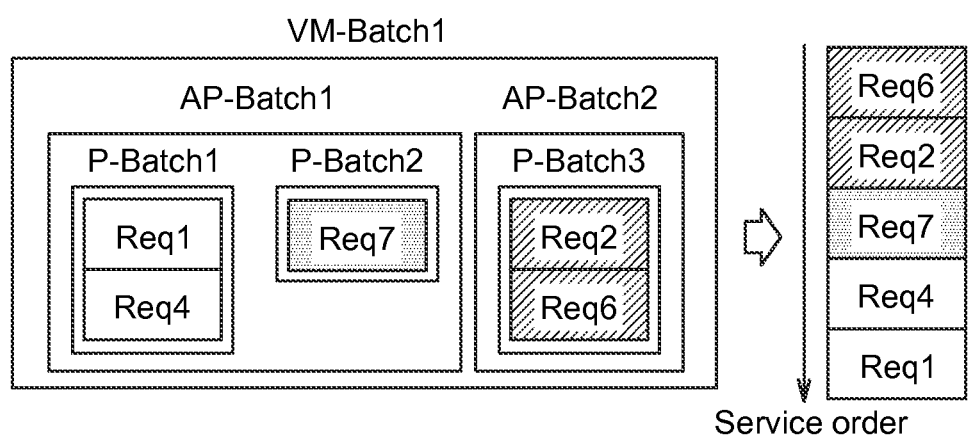
FIG. 6 illustrates a schematic diagram of an intra scheduling according to one embodiment of the present invention.

FIG. 6 illustrates a schematic diagram of an intra scheduling according to one embodiment of the present invention. In one embodiment, the intra scheduling follows the following rules:

1. Request in a VM-batch are scheduled consecutively;
2. Within a VM-batch, requests in an AP-batch are scheduled consecutively;
3. Within an AP-batch, requests in a P-batch are scheduled consecutively; and 4. Within a P-batch, requests are scheduled in an I/O address order.

Based on the abovementioned rule, the service order of the requests Req1, Req2, Req4, Req6 and Req7 is Req1→Req4→Req7→Req2→Req6, as shown in FIG. 6.

Figure 7:
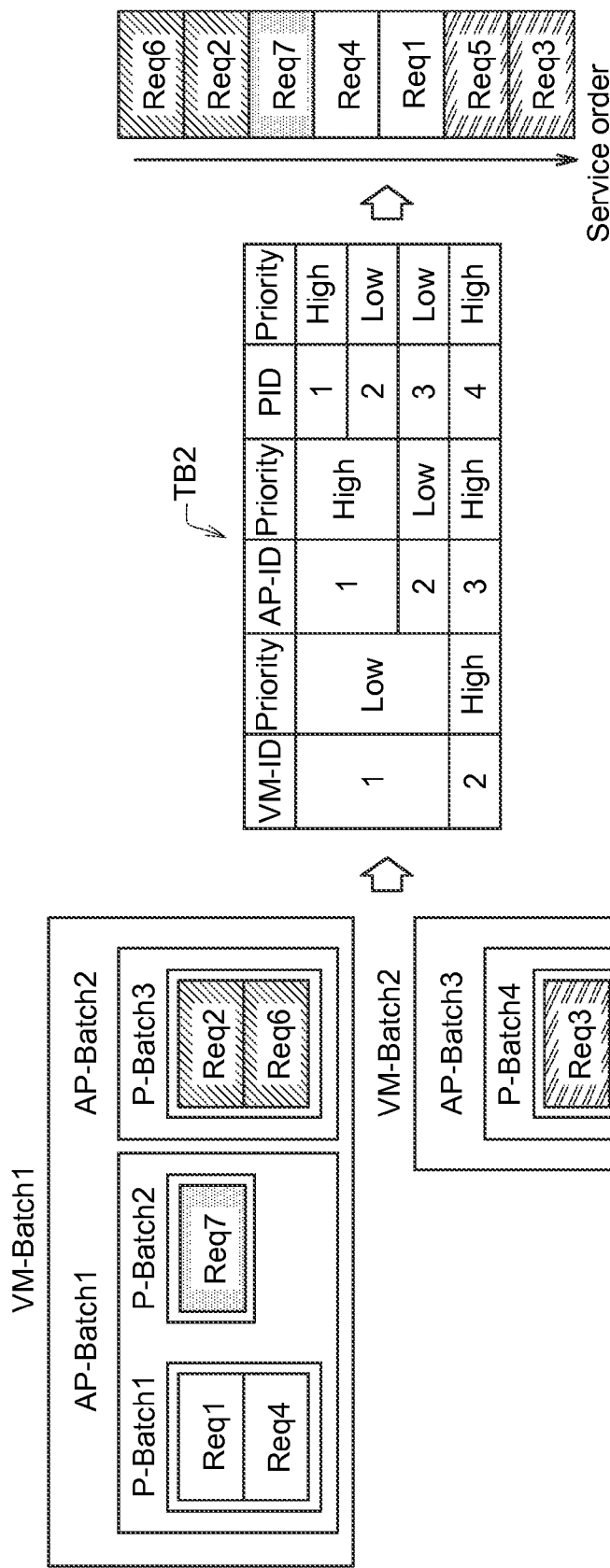
FIG. 7 illustrates a schematic diagram of an inter scheduling according to one embodiment of the present invention.

FIG. 7 illustrates a schematic diagram of an inter scheduling according to one embodiment of the present invention. In one embodiment, the inter scheduling follows the following rules:

1. Prioritize each batch; and
2. Batches are scheduled in a specific fashion, e.g., a round-robin fashion, weighted-round-robin fashion, etc., to guarantee fairness or quality-of-service (QoS).

In the example of FIG. 7, the scheduler 104 arranges the service order of the batches of different hierarchy levels according to the priority mapping table TB2. As shown in FIG. 7, the VM-batch2 with highest priority is selected at first. Because the VM-batch2 only includes the AP-Batch3 which only includes the P-Batch4, requests Req3 and Req5 within the P-Batch4 are selected to be served. Then, the VM-batch1 with lower priority is selected. Within the VM-batch1, the AP-batch1 with the higher priority is selected. The AP-batch1 includes the P-batch1 and the P-batch2, and the former has the higher priority. Thus, requests Req1 and Req4 in the P-batch1 are selected to be served. Then, request Req7 in the P-batch2 is selected to be served. Finally, the AP-batch2, which only includes the P-Batch3, is selected, and requests Req2 and Req6 in the P-Batch3 are then selected to be served.

Figure 8:
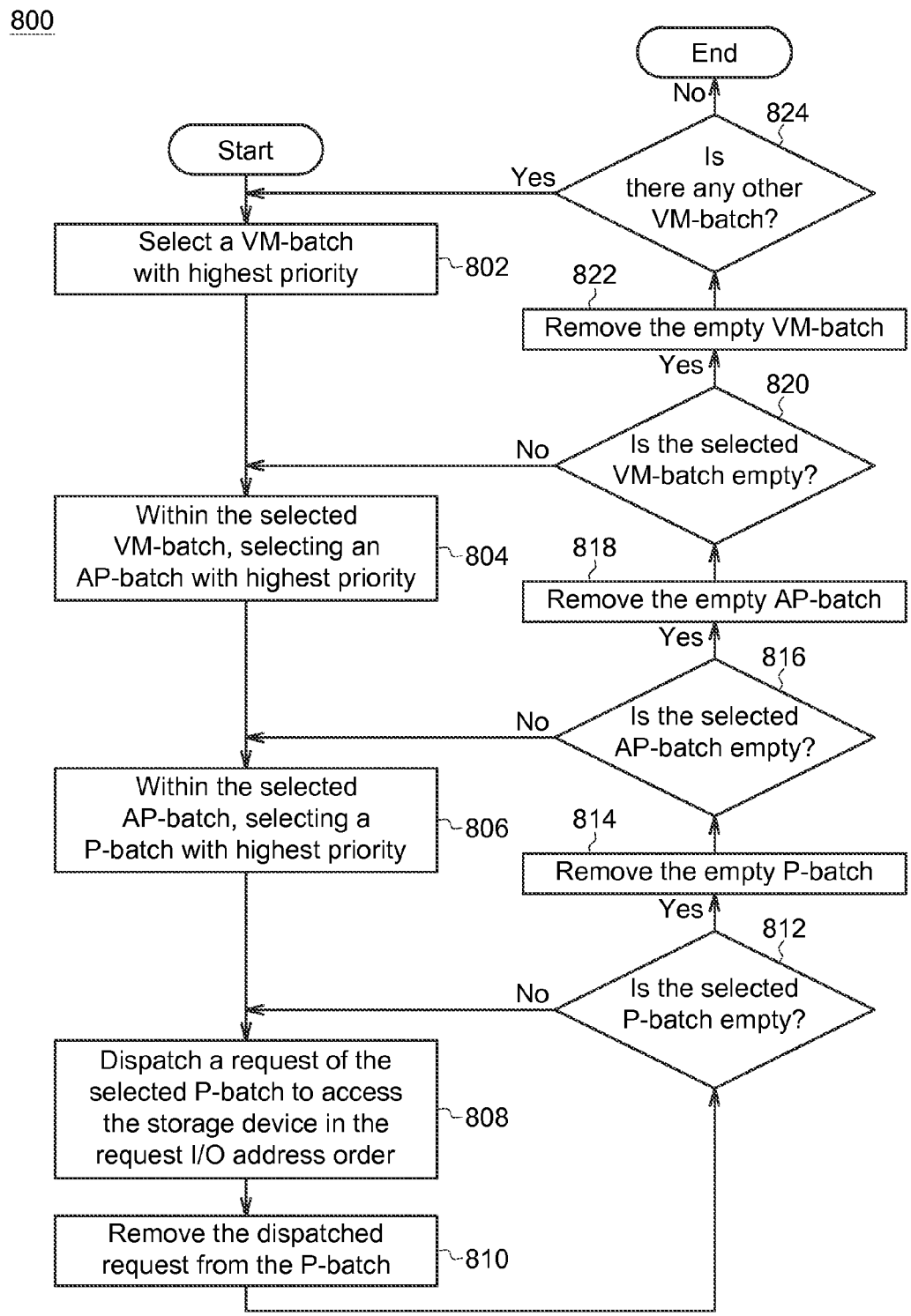
FIG. 8 illustrates a flowchart of a scheduling procedure according to one embodiment of the present invention.

FIG. 8 illustrates a flowchart 800 of a scheduling procedure according to one embodiment of the present invention. In the example of FIG. 8, the scheduler 104 may prioritize each virtual-machine-level batch, each application-level batch and each process-level batch according to a corresponding priority level in the application-level information.

The scheduling procedure starts, for example, when there is at least one batch in the I/O scheduler. At step 802, a VM-Batch with the highest priority is selected. At step 804, within the selected VM-batch, the scheduler 104 selects an AP-batch with highest priority. At step 806, within the selected AP-batch, the scheduler 104 selects a P-batch with highest priority. At step 808, the scheduler 104 dispatches a request of the selected P-batch to access the storage device in the request I/O address order. At step 810, the dispatched request is removed from the P-batch.

At step 812, the scheduler 104 checks whether the selected P-batch is empty. If yes, the empty P-batch is removed at step 814. If not, the procedure goes to step 808.

Again, at step 816, the scheduler 104 checks whether the selected AP-batch is empty. If yes, the empty AP-batch is removed at step 818. If not, the procedure goes back to step 806.

Then, at step 820, the scheduler 104 checks whether the selected VM-batch is empty. If yes, the empty VM-batch is removed at step 822. If not, the procedure turns back to step 804. At, step 824, the scheduler 104 determines that is there any VM-batch. If yes, the procedure goes back to step 802.

In summary, the present invention provides an interface module to monitor the statuses of applications and collect application-level information. The collected application-level information can be transferred by the proposed interface module to the I/O scheduler via an independent data path, such that the I/O requests are scheduled according to the application-level information.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing system, comprising:
a storage device;
an interface module, implemented by a processor coupled to the storage device, dispatching a non-prioritized request via a first data path, and transferring application-level information of an application via a second data path; and
a scheduler, coupled to the first and second data paths, enabling an access to the storage device according to the non-prioritized request and the application-level information respectively received from the first and second data paths; wherein the second data path comprises a service driver to dispatch the application-level information obtained from the interface module to the scheduler.

2. The data processing system according to claim 1, wherein the interface module monitors the application to collect the application-level information.

3. The data processing system according to claim 1, wherein the application-level information comprises at least one of a priority level of the application and an operating state of the application.

4. A data processing system, comprising:
a storage device;
an interface module, implemented by a processor coupled to the storage device, dispatching a non-prioritized request via a first data path, and transferring application-level information of an application via a second data path; and
a scheduler, coupled to the first and second data paths, enabling an access to the storage device according to the non-prioritized request and the application-level information respectively received from the first and second data paths; wherein the second data path comprises a virtual file to record the application-level information obtained from the interface module, and the application-level information recorded in the virtual file is provided to the scheduler to perform request scheduling.

5. The data processing system according to claim 1, wherein the interface module is included in a virtual machine, while the scheduler is external to the virtual machine.

6. The data processing system according to claim 1, wherein the scheduler performs request batching, including:
identifying a corresponding virtual machine and a corresponding application for the non-prioritized request according to the application-level information;
forming a virtual-machine-level batch by grouping requests of a same virtual machine;
forming a application-level batch by grouping requests within the virtual-machine-level batch from a same application; and
forming a process-level batch by grouping requests within the application-level batch from a same process.

7. The data processing system according to claim 6, wherein the requests in the virtual-machine-level batch are scheduled consecutively; within the virtual-machine-level batch, the requests in the application-level batch are scheduled consecutively; within the process-level batch, the requests are scheduled in an input/output (I/O) address order.

8. The data processing system according to claim 6, wherein the scheduler prioritizes the virtual-machine-level batch, the application-level batch and the process-level batch according to a corresponding priority level in the application-level information.

9. The data processing system according to claim 1, wherein the first data path comprises a virtual file system and a file system.

10. The data processing system according to claim 9, wherein the second data path bypasses the virtual file system and the file system of the first data path, and is directly coupled to the scheduler.

11. The data processing system according to claim 9, further comprising:
a virtual machine implemented by the processor, wherein the virtual machine comprises:
a virtual storage; and
a guest scheduler, enabling an access to the virtual storage according to the application-level information and the non-prioritized request received from the interface module.

12. A data processing system, comprising:
a processor, dispatching a non-prioritized request via a first data path, and transferring application-level information of an application via a second data path, and;
a first memory, coupled to the processor, storing the application-level information dispatched by the processor; and
a second memory, coupled to the processor, wherein the processor schedules the non-prioritized request to access the second memory according to the application-level information stored in the first memory; wherein the second data path comprises a service driver to dispatch the application-level information.

13. The data processing system according to claim 12, wherein the application-level information comprises at least one of a priority level of the application and an operating state of the application.

14. A processor-implemented data processing method, comprising:
dispatching a non-prioritized request via a first data path;
transferring application-level information of an application via a second data path; and
enabling an access to a storage device according to the non-prioritized request received from the first data path and the application-level information received from the first data path; wherein the second data path comprises a service driver to dispatch the application-level information.

15. The processor-implemented data processing method according to claim 14, wherein the application-level information comprises at least one of a priority level of the application and an operating state of the application.

16. The processor-implemented data processing method according to claim 14, further comprising:
identifying a corresponding virtual machine and a corresponding application for the non-prioritized request according to the application-level information;
forming a virtual-machine-level batch by grouping requests of a same virtual machine;
forming a application-level batch by grouping requests within the virtual-machine-level batch from a same application; and
forming a process-level batch by grouping requests within the application-level batch from a same process.

17. The processor-implemented data processing method according to claim 14, further comprising:
arranging the non-prioritized request into a batch; and
scheduling a service order of the batch according to the application-level information.

* * * * *